Aug. 25, 1936.  C. A. VERSCHOOR  2,052,261
PHOTOGRAPHIC CAMERA
Filed March 12, 1936   2 Sheets-Sheet 1
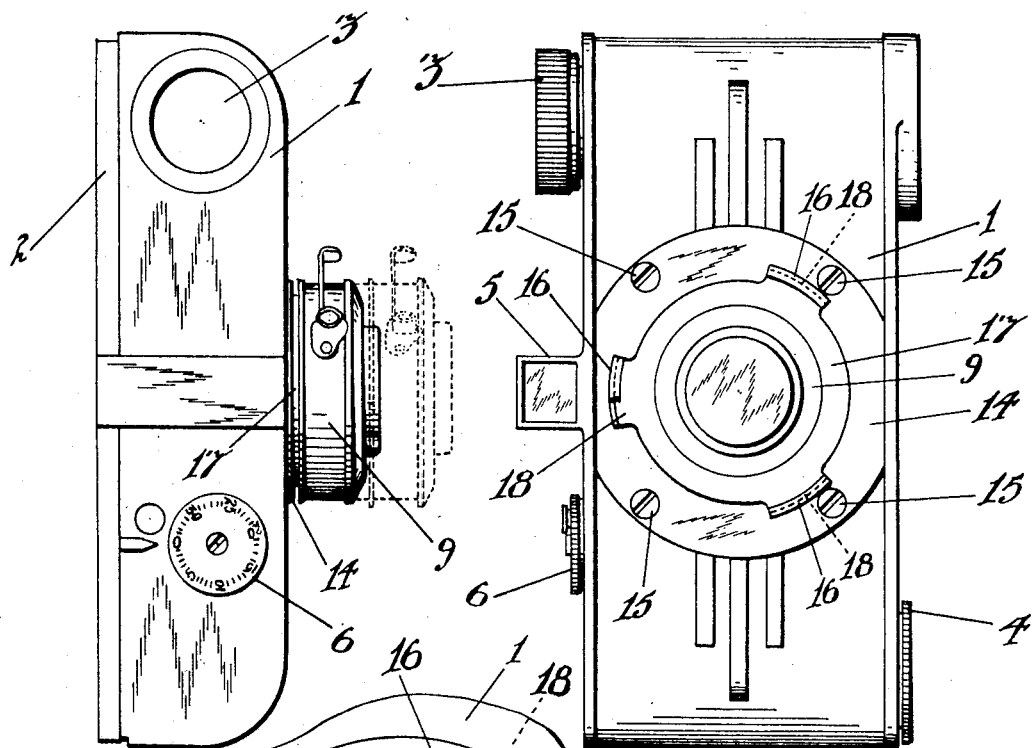
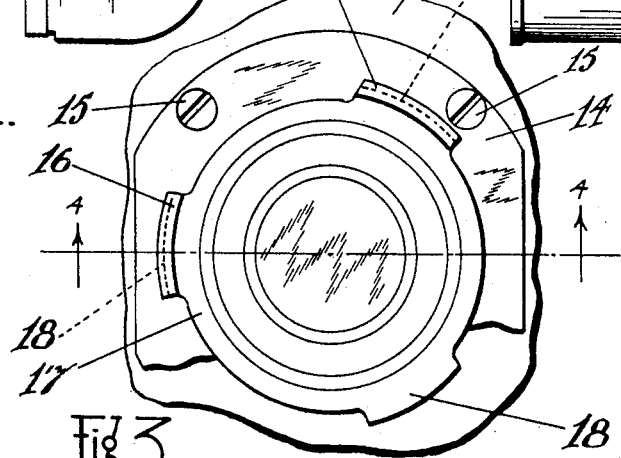
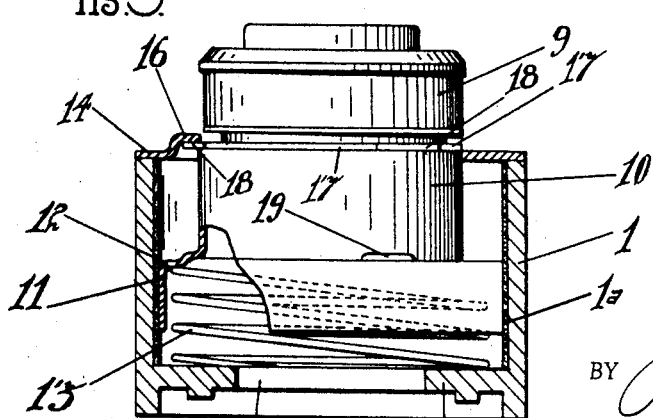
INVENTOR.
CHARLES ALBERT VERSCHOOR.
BY Philip S. Hopkins
ATTORNEY.

Aug. 25, 1936.  C. A. VERSCHOOR  2,052,261
PHOTOGRAPHIC CAMERA
Filed March 12, 1936   2 Sheets-Sheet 2

INVENTOR.
CHARLES ALBERT VERSCHOOR.
BY Philip S. Hopkins
ATTORNEY.

Patented Aug. 25, 1936

2,052,261

UNITED STATES PATENT OFFICE 2,052,261

PHOTOGRAPHIC CAMERA

Charles Albert Verschoor, Ann Arbor, Mich.

Application March 12, 1936, Serial No. 68,500

6 Claims. (Cl. 88—57)

My invention relates to photographic cameras and particularly to a lens and shutter mounting therefor.

My invention relates especially to cameras of the so-called miniature type now enjoying commercial popularity and with which relatively small sharp images are obtained on small sized film of the order of 35 mm. width and then enlarged therefrom as desired. This type of camera has many advantages over the larger cumbersome sizes in that it is compact and easily carried in the pocket, and permits of economy in the making of pictures by virtue of the small sized film used, and from which only the selected exposures are enlarged for prints.

One of the principal objects of my invention lies in the provision of a very simple mechanical mounting for the lens and shutter unit on the camera by means of which this unit may be retracted to a position directly adjacent the camera body when not in use to thus reduce the over-all dimensions of the camera for convenient carrying but which permits the extension of the lens and shutter unit to outward position whereby a relatively long focus lens may be used with its attendant advantages.

Another object lies in the provision of means whereby the lens and shutter unit may be adjusted in its operative position for focusing.

More specifically my invention pertains to a telescopically mounted barrel-like lens and shutter support normally urged outwardly to picture taking position and which may be readily and quickly retracted and secured in its retracted position, for convenience in carrying. Cooperating means are provided between the lens and shutter mounting and the camera whereby adjustment may be made for focusing in the picture taking position.

The simplicity of the mechanism and its economy of manufacture form another object of this invention and commercially an important one because of the reduction in cost of manufacture.

Other objects and advantages will be apparent as the description proceeds, reference now being had to the figures of the accompanying drawings forming a part of this application and wherein like reference numerals indicate like parts.

In the drawings:

Figure 1 is a side view of my improved camera showing the lens and shutter unit in full lines in its inoperative position and in its operative position in dotted lines.

Figure 2 is a front plan view of the camera.

Figure 3 is a detail front view of the lens and shutter mount in its inoperative position on the camera.

Figure 4 is a detail sectional view taken on the line 4—4 of Figure 3.

Figure 5:
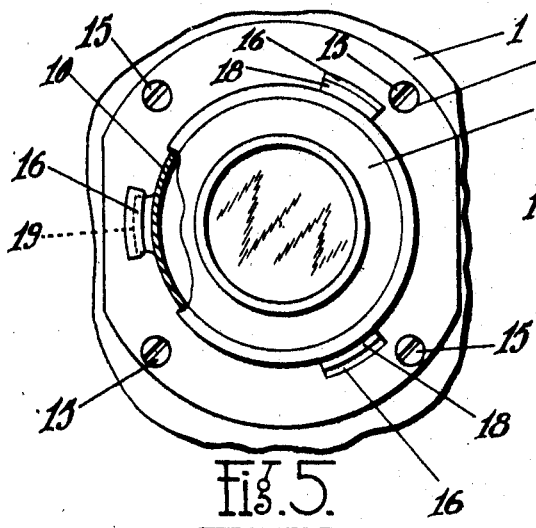
Figure 5 is a detail front view of the lens and shutter mount in its furthest extended position for "close-ups", certain parts being broken away for clearness.
Figure 7:
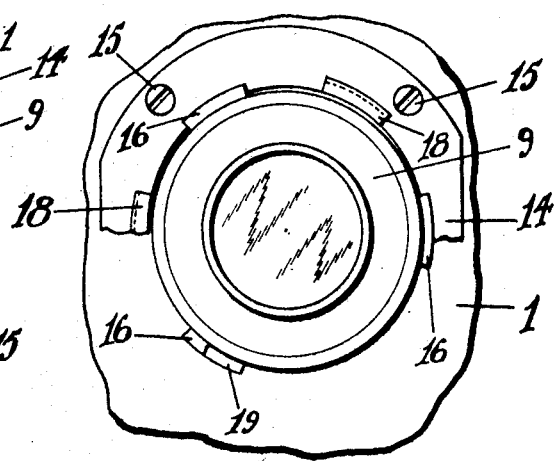
Figure 7 is a detail front plan view of the lens and shutter mount in its operative position and adjusted for "long shots", certain parts being broken away for clearness.

I have shown and will describe my invention as provided with two positions of focus—namely, for "close-ups" and for "long shots". It will be clear, however, from the subsequent description that additional positions of adjustment may be provided for different focusing steps.

The reference character 1 refers generally to the body of the camera which may be of any desired construction and material. The camera is provided with a suitable removable back 2 to permit loading and unloading of the film within the body of the camera, and for making possible the attachment of the camera to an enlarger apparatus wherein the camera lens serves as the projecting lens for the enlarger. A winding piece 3 is provided for the take-up film chamber and a winding piece 4 is provided for the supply film chamber whereby the film may be rewound thereinto, in a manner familiar to users of cameras of this type. A view finder 5 is provided as is also a suitable footage indicator 6, the details of which form no part of this invention.

The body 1 of the camera is provided internally and substantially centrally with a partition 7 provided with an opening 8 in alignment with the exposure area of the film and with the lens and shutter unit indicated generally at 9.

The lens and shutter unit 9 are suitably mounted upon the forwardly projecting end of a tubular hollow barrel-like support 10 projecting into the body of the camera in alignment with the opening 8 and having an enlarged flanged portion 11 adapted to engage against and be guided by the inner surface of the compartment formed within the side walls 1. The shoulder 12 provided by the enlarged flange portion 11 serves as an abutment for one end of a coil spring 13, the opposite end of which engages against the partition 7, and the tendency of such spring is to normally urge the support 10 and the lens and shutter unit 9 thereon, outwardly but which, as shown clearly in Figure 4, is readily compressible when these elements are pushed inwardly.

Secured to the front of the camera 1 and encircling the lens and shutter unit 9 is a locking ring 14 fastened to the camera front in any suitable manner as by the screws 15. This ring is provided at a plurality of points around its inner circumference and directly adjacent the lens and shutter unit 9 with outwardly formed locking flanges 16 preferably formed out of the material of the ring itself, such flanges being bent at right angles to the ring 14 and thence inwardly at right angles towards the lens and shutter unit 9 as shown clearly in Figure 4. Three of these locking flanges have been shown but it will be obvious that two or more can be provided if desired.

Carried by the lens and shutter unit 9 is a locking ring 17 rigidly fixed to such unit. As is apparent from the drawings, the supporting unit 10, the lens and shutter unit 9, and the locking ring 17, are freely rotatable on the camera. The locking ring 17 is provided at a plurality of specified points, corresponding with the number of locking flanges 16, with outwardly extending locking fingers 18 which when the lens and shutter unit 9 and its support are pushed inwardly to the position shown in Figure 4, may be engaged beneath the locking flanges 16 as shown clearly in Figures 2, 3 and 4, whereby such lens and shutter unit with its support are secured in the innermost position shown in full lines in Figure 1, namely, out of operative position. By simply rotating the unit, the locking fingers 18 disengage from beneath the locking flanges 16 and permit the spring 13 to move the unit outwardly.

Figure 6:
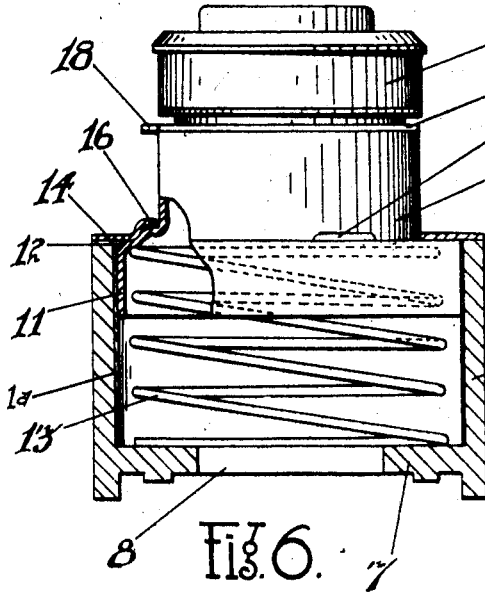
Figure 6 is a detail side view of the lens and shutter mount in the position shown in Figure 5 and including in section the position of the camera body within which the unit is mounted.
Figure 8:
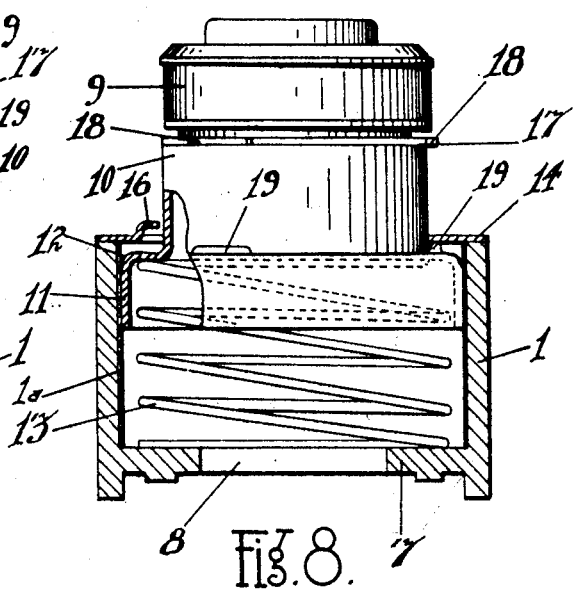
Figure 8 is a view similar to Figure 6 but showing the same elements in the position shown in Figure 7.

The shouldered portion 12 of the support 10 is provided at spaced intervals with lugs 19 which, when the unit assumes its outward position as just described, engage against the inner or rear surface of the locking ring 14, as shown clearly in Figure 8. In this position the lens and shutter unit are in the proper focal position for "long shots". If "close-ups" are desired, the unit 9 and support 10 may be rotated to bring the lugs 11 into registry with the locking flanges 16 whereupon the continued outward movement or adjustment of the unit 9 and support 10 is permitted by virtue of the lugs 9 moving into the recess formed in the locking plate 14 by the flanges 16, such lugs then engaging the undersides of the locking flanges 16. This is shown clearly in Figure 6 and constitutes the proper focal position of the unit for "close-ups".

It will be quite clear that from either of the two outwardly adjusted positions of the lens and shutter unit, the same may be pushed inwardly to the full line position shown in Figure 1, and turned to bring the locking fingers 18 beneath the locking flanges 16 for easy and convenient transportation. The sliding engagement between the flange 11 of the supporting member 10 and the interior wall of the camera body, plus a velvet or other lining 1a on the interior of the casing, provides a lock-tight connection whereby the only light capable of reaching the film in its exposure position in the camera is through the lens and through the supporting member 10.

Many changes may be made in details of construction and arrangement of parts without departing from the spirit and scope of my invention. I do not limit myself, therefore, to the exact form herein shown and described other than by the appended claims.

I claim:

1. A camera comprising a casing having a hollow chamber, a lens and shutter unit, a support for said unit slidably mounted in said chamber and projecting outwardly from the same, means normally urging said support and unit outwardly, means on said support and cooperating with said casing for limiting the outward movement of said unit, and means on said support and cooperating with means on said casing for locking said unit and support in its inner position.

2. A camera comprising a casing having a hollow chamber, a lens and shutter unit, a support for said unit slidably mounted in said chamber and projecting outwardly therefrom, means normally urging said support and unit outwardly, means on said support and cooperating with means on said casing for limiting the outward movement of said unit and support to a plurality of predetermined focal positions, and means on said casing for locking said unit and support in its inner position.

3. A camera comprising a casing having a hollow chamber, a lens and shutter unit, a support for said unit slidably mounted in said chamber and projecting outwardly therefrom, means normally urging said support and unit outwardly, means on said support, and cooperating with means on said casing for limiting the outward movement of said unit and support to a plurality of predetermined focal positions, and means on said casing for locking said unit and support in its inner position, said last named means comprising a fixed locking ring on said casing having means overlying a flanged portion of said support.

4. A camera comprising a casing having a hollow chamber, a lens and shutter unit, a support for said unit slidably mounted in said chamber and projecting outwardly therefrom, means normally urging said support and unit outwardly, means on said support and cooperating with means on said casing for limiting the outward movement of said unit and support to a plurality of predetermined focal positions, and means on said casing for locking said unit and support in its inner position, said last named means comprising a fixed locking ring on said casing having means overlying a flanged portion of said support and said flanged portion having a plurality of levels for engaging said ring.

5. A camera comprising a casing having a hollow chamber, a lens and shutter unit, a support for said unit slidably mounted in said chamber and projecting outwardly therefrom, spring means normally urging said support and unit outwardly, a locking ring on said casing and having a flange overlying a flanged portion of said support, lugs formed outwardly on said ring at spaced points, a latch ring on said support having spaced fingers adapted to engage beneath said lugs and lock said unit and support in its inner position against the tension of said spring, said locking ring being engageable by the flanged portion of said support to limit the outward movement thereof.

6. A camera comprising a casing having a hollow chamber, a lens and shutter unit, a support for said unit slidably mounted in said chamber and projecting outwardly therefrom, spring means normally urging said support and unit outwardly, a locking ring on said casing and having a flange overlying a flanged portion of said support, lugs formed outwardly on said ring at spaced points, a latch ring on said support having spaced fingers adapted to engage beneath said lugs and lock said unit and support in its inner position against the tension of said spring, said locking ring being engageable by the flanged portion of said support to limit the outward movement thereof, and spaced lugs on said flanged portion of said support, registrable and engageable with the lugs on said locking ring to permit a plurality of outward focal positions of said support and unit.

CHARLES ALBERT VERSCHOOR.